Dec. 23, 1941.　　　　　E. C. WENTE　　　　　2,267,544
OPTICAL ELEMENT
Filed July 25, 1939
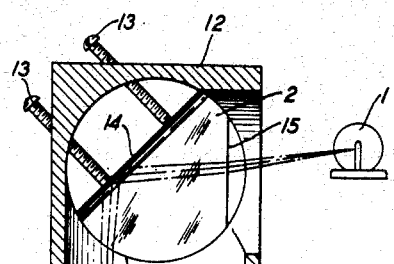
FIG. 1
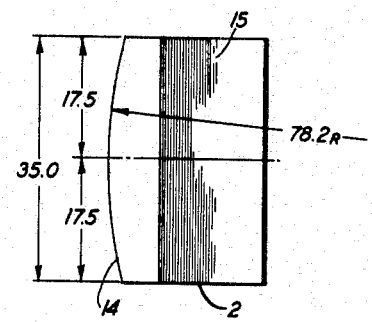
FIG. 3
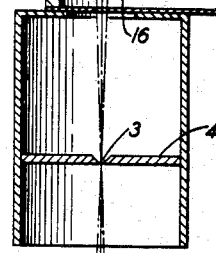
FIG. 2
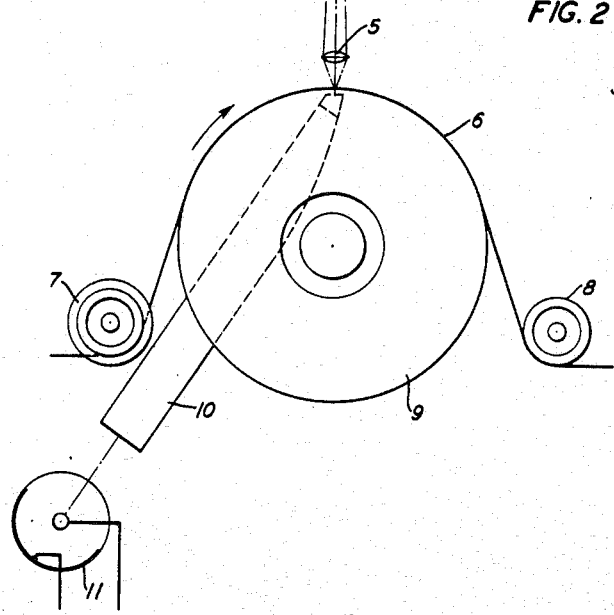
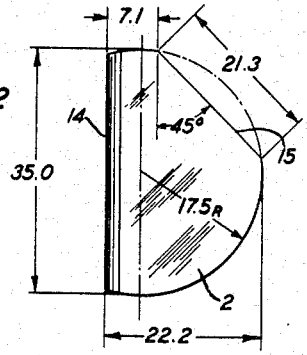
INVENTOR
E. C. WENTE
BY
ATTORNEY Patented Dec. 23, 1941

2,267,544

UNITED STATES PATENT OFFICE 2,267,544

OPTICAL ELEMENT

Edward C. Wente, New York, N. Y., assignor to Bell Telephone Laboratories, Incorporated, New York, N. Y., a corporation of New York Application July 25, 1939, Serial No. 286,310

4 Claims. (Cl. 88—24)

This invention relates to optical elements, and particularly to optical elements for illuminating a long, narrow area.

The object of the invention is an optical element which will uniformly illuminate a long narrow area with a beam of intense light.

A feature of the invention is a single homogeneous transparent optical element forming a reflecting surface which focusses the light in one dimension of the area, and also forming a refracting surface which focusses the light in another dimension of the area, angularly located with respect to the first dimension.

The invention is peculiarly adapted for forming a narrow beam of intense light for scanning a film sound record, but is not limited to this particular use, and may be used in any optical system producing a narrow beam of light, such as the systems used in picture transmission, television, tape exhibitors, and many others.

In the drawing:

Fig. 1 discloses the invention associated with the optical system of a film sound reproducing system;

Figs. 2 and 3 show details of the optical element.

In Fig. 1 light from the source 1 is reflected and refracted by the element 2 to illuminate a slit 3 in the opaque plate 4. The illuminated slit 3 is imaged by the lens system 5 upon the surface of the film sound record 6, traversed in the usual manner by the drive wheels 7, 8, over the drum 9. The light transmitted through the record 6 may be directed by the transparent rod 10 to a photoelectric cell 11. While a particular form of drive for the film has been indicated, the invention is not, in any way, limited to the particular drive shown, nor is the invention limited to systems in which the record is scanned by transmitted light. Other methods of driving the film may be used, the light sensitive device may be directly excited by the scanning beam, the light may be reflected by the record or other changes made in the optical system.

For satisfactory reproduction of the higher frequencies of sound, the scanning beam should not be more than 0.0005 inch high, lengthwise of the film, at the reproducing point. To reduce diffraction effects, and insure a clear image, the slit 3 in the plate 4 should not be less than about 0.005 inch high. Using these typical values, the lens system 5 will have a minification of 10. In the present standard sound record the scanning beam covers about 0.080 inch. Thus, the slit 3 in the plate 4 will be about 0.005 inch high and 0.800 inch wide. To intensely and evenly illuminate a slit 0.800 inch wide by means of refracting elements would require a highly corrected lens system or one of quite large size having a diameter of some four or five inches. By using a reflecting element, a large virtual aperture may be obtained in a device having a comparatively small size.

One typical embodiment of the optical element, suitable for use in a film reproducing system, is shown in Figs. 2 and 3, the dimensions given being in millimeters, and the element being made of borosilicate crown glass, $N_D = 1.52$. The element may be made by first grinding a right cylinder 35 millimeters diameter and 35 millimeters high. A segment of the cylinder may then be ground off to a radius of 78.2 millimeters forming a surface 14. A perpendicular bisector of a chord across the arc of this surface is angularly disposed with respect to the axis of the cylinder, in the present case the angle being a right angle, though other angles may be used if convenient. The element may conveniently be mounted in a holder 12, having a central bore of about 35 millimeters. The angular location of the element may be fixed by screws 13, 13, bearing on the element.

The light from the source 1 falls on the reflecting surface 14, preferably at an angle that produces complete reflection, and is focussed by the reflecting surface to evenly illuminate the 0.800 inch width of the slit 3. The rays emerging from the element 2 are refracted by the curved exterior of the element and focussed to evenly illuminate the 0.005 inch height of the slit 3.

In some cases, the image formed may have a slight curvature, but this effect may be compensated by a small flat area 15, ground from the cylinder facing the source of light, and/or by a slight change in the position of the source.

In a typical embodiment of the invention, using an element of the type shown in Figs. 2 and 3, the optical system is adjusted so that the surfaces 15 and 16, by refraction focus the light from the source 1 at the slit 3, in one direction only in the plane of the drawing. If the angle of the light passing through the slit 3 covers the entrance pupil of the lens system 5 in this plane, the lens 5 will work at full aperture.

In the direction perpendicular to the plane of the drawing, the optical system is adjusted so that the surface 14, by reflection, and the surfaces 15 and 16 by refraction, focus the light from the source 1 on the entrance pupil of the lens system 5. The lens system 5 forms an image of the slit 3 on the film 6. As the source 1 is not imaged lengthwise on the slit 3, a coil filament type of incandescent lamp may be used for the source 1, and still produce a uniform illumination of the slit 3 along its length and a uniformly bright line of light at the point of translation. When the source 1 is focussed on the entrance pupil of the lens system 5 and the image is large enough to cover the entrance pupil, the lens system 5 will work at its full aperture in the direction perpendicular to the plane of the drawing. The optical system must be large enough that the rays of light will pass to the top and bottom of the entrance pupil of the lens system 5 from every part of the slit 3, in order that the image of the slit 3 on the film 6 may be uniformly bright along its whole length.

The optical element may also be made of two or more pieces of glass closely associated and ground as a unit to the desired shape, but, an element ground from a single piece of glass will generally be found to be preferable.

What is claimed is:

1. In an optical system for uniformly illuminating a long narrow area, an optical element comprising a transparent body having one surface forming a concave cylindrical totally reflecting surface abaxially aligned to and facing the light source and another surface forming a convex cylindrical lens angularly inclined to said first surface to refract the light reflected from said surface.

2. The element in claim 1 when the cylindrical lens is inclined at a right angle to the reflecting surface.

3. The element in claim 1 when formed of a single, homogeneous body.

4. The element in claim 1 when formed with a plane surface presented to the light source.

EDWARD C. WENTE.